United States Patent [19]

Bucksbee et al.

[11] Patent Number: 4,530,491

[45] Date of Patent: Jul. 23, 1985

[54] COMPACT LOW-FREQUENCY ENGINE MOUNTING

[75] Inventors: James H. Bucksbee, McKean; Andrew D. Campany, Erie, both of Pa.

[73] Assignee: Lord Corporation, Erie, Pa.

[21] Appl. No.: 554,747

[22] Filed: Nov. 23, 1983

[51] Int. Cl.³ .............................................. F16F 15/08
[52] U.S. Cl. .................................. 267/141; 267/141.2
[58] Field of Search ................ 248/560; 267/140, 141, 267/141.1, 141.2, 141.3, 141.4, 141.5, 141.6, 141.7

[56] References Cited

U.S. PATENT DOCUMENTS

| 2,382,372 | 8/1945 | Wallerstein | 267/140.2 |
| 2,926,881 | 3/1960 | Painter | 267/141.4 |
| 3,350,042 | 10/1967 | Stewart et al. | 267/141.4 |
| 3,809,427 | 5/1974 | Bennett | 267/141 X |
| 3,957,127 | 5/1976 | Bouchard et al. | 248/599 |

FOREIGN PATENT DOCUMENTS

| 1451322 | 7/1966 | France | 267/141 |
| 70510 | 7/1952 | Netherlands | 267/141.4 |

*Primary Examiner*—Duane A. Reger
*Attorney, Agent, or Firm*—Joseph H. Heard

[57] ABSTRACT

Axial loads and motions upon a unitary body of elastomer of the mount effects compressive deflection and bi-direction bulging of a first ring-like portion of the body, and shear of deflection of a second, tubular portion of the body. The second portion of the body also imparts lateral stability to the mount. The mount can be economically manufactured and installed.

7 Claims, 4 Drawing Figures

COMPACT LOW-FREQUENCY ENGINE MOUNTING

BACKGROUND OF THE INVENTION

For many years, conventional American vehicle engine suspension systems have employed 12 Hz vertical frequency suspension components (i.e., engine mounts). This frequency has been practical since it is typically low enough to isolate engine firing disturbances, but at the same time is high enough to facilitate a compact elastomeric design. A lower frequency cannot always be used due to the fact that static deflection, and static part strain for a given envelope size, decrease as a function of frequency squared. In a linear system, for example, this relationship is expressed mathematically as:

$$\delta = 9.788/f_n^2,$$

where:
 $\delta$ = static deflection in inches; and
 $f_n$ = vertical natural frequency of the mounting in Hertz.

Hence, as the mounting is designed toward lower natural frequencies, the static deflection increases as a square function (e.g., to reduce $f_n$ by two requires static deflection increase by four). This means that for a given mounting envelope size, reduction of actual frequency results in a penalty in terms of part strain and life.

Another factor complicating the design of relatively low-frequency engine suspension systems is mount stability. Designs that carry weight in shear tend to be large. On the other hand, designs that carry weight in compression tend to be laterally unstable. The traditional solution to this problem is to use a design that carries the weight in a combination of shear and compression. This has resulted in "V-type" mounting arrangements or "conical" mountings, well known in the art.

In European vehicle engine suspension systems, lower frequency engine mounts (typically 8 Hz) are more common. This is due to several factors. Among these are lower engine idle speeds, light-weight truck structures and differences in Government regulations. Relatively large engine mounts can be and are employed in many European vehicles since they are designed to accommodate mounts of large size. However, for the many other vehicles which have not been so designed, more compact low-frequency mounts are required.

DESCRIPTION OF THE PRIOR ART

In addition to those of the "V" and "conical" types, mountings which undergo compression and shear deflection are disclosed in Wallerstein U.S. Pat. No. 2,382,372 and Bouchard U.S. Pat. No. 3,957,127. The Wallerstein structure has an annular elastomer ring which is loaded in compression and a central elastomer which is vertically loaded in shear and may also be laterally loaded in compression. However, the Wallerstein design is relatively complicated and difficult to manufacture and install, and may lack stability under large lateral loading. The Bouchard utilizes a compression member which is unable to bulge radially in both directions, and apparently it and the shear member necessarily are formed independently, complicating the manufacture and assembly of the mount.

SUMMARY OF THE INVENTION

The present invention provides a low-frequency mount which is of compact size, is economical to manufacture and install, and which in operation has good lateral stability. In a preferred embodiment thereof, the mount includes a unitary body of elastomeric material which has first and second integrally formed portions. Axial loads and motions upon the body are supported and accommodated by compressive deflection of one of its portions, which is of ring-like form and has a very low shape factor, and by shear deflection of its other portion, which is of elongate tubular shape and is encircled by the first body portion. The spring rates of the two portions of the body are not interdependent even though the body portions are formed integrally with each and are both bonded to a common rigid member. In addition to its aforesaid function, the tubular portion of the body also imparts high lateral stability to the mount.

DESCRIPTION OF THE DRAWINGS

Other features of the invention will be apparent from the following description of an illustrative embodiment thereof, which should be read in conjunction with the accompanying drawing, in which.

DESCRIPTION OF THE PREFERRED EMBODIMENT

Figure 1:
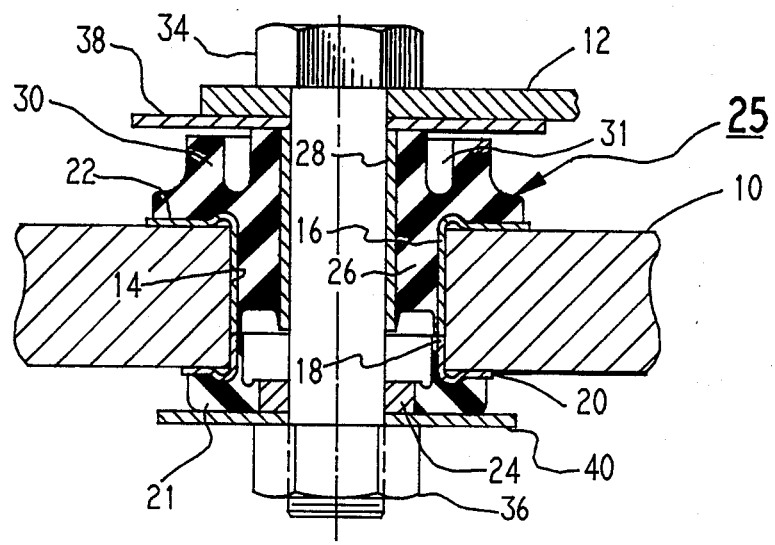
FIG. 1 is a cross-sectional view of the engine mount of the invention showing the mount under no precompression and no external load.

With reference now to the drawings, and particularly to FIG. 1, there is shown a supporting member 10 and a supported member 12. The member 10, might for example be part of a vehicle chassis and the member 12 a bracket or other part of an engine for that vehicle. The supporting member 10 is provided with a generally cylindrical opening or bore 14 which receives an upper rigid sleeve 16 and a lower rigid sleeve 18. A radial end flange 20 of lower sleeve 18 overlies the bottom surface of the supporting member 10, and a radial end flange 22 of upper sleeve 16 overlies the upper surface of the supporting member 10. An annular rebound body 21, which is formed from a resilient elastomer, is bonded to flange 20 of sleeve 18 and to an annular rigid element 24 which normally is axially aligned with bore 14.

A load supporting and motion accommodating elastomer body 25 includes a central tubular shear portion 26 which is bonded to upper sleeve 16 and also to a central tubular rigid element 28. Body 25 further includes an annular compression portion or ring 30 which is bonded to flange 22 of member 16 and which projects vertically upwardly therefrom in concentric encircling relationship to the upper part of body portion 26 and element 28. The ring-like portion 30 is separated from portion 26 by an annular trough 31 throughout its upper extend but is integrally joined to portion 26 at its lower end, the two portions being formed from an elastomer as a single body 25. A bolt 34 passes through the central rigid elements 24, 28 and is provided at its lower end with threads which receive a nut 36. A washer 40 is interposed between the nut 36 and the rebound elastomer body 21, and preferably is bonded to such body. A washer 38 may be and illustratively is also interposed between the undersurface of supported member 12 and the terminal upper surfaces of the load supporting elastomer body 25. The use of washer 38 is particularly desirable when the undersurface of supported member 12 is rough, or is not large enough to overlie all of body portion 30, and it is preferred that such washer be bonded to body 25.

The undersurface of the central tubular shear portion 26 of elastomer body 25 is tapered or filleted so as to lessen tension stress at its bonded interface with the lower portion of the inner rigid tube 28. This discourages possible debonding or pulling away of the elastomer from the lower portion of the inner rigid tube at its lower end. The uppermost surface of body portion 26 preferably abuts the undersurface of washer 38 or, if such washer should not be employed, the undersurface of member 12.

By employing vulcanization bonding, the subassembly comprised of elastomer body 25, elements 16, 28 and washer 38 may be formed simultaneously with molding of the elastomer body thereof. The same is also true of the subassembly comprised of rebound elastomer body 21, rigid elements 18, 24 and washer 40. The rigid sleeve elements 16, 18 of each subassembly are sized so as to have a slip-fit, rather than a press-fit, relationship with bore 14 of support member 10. Installation of the mount therefore may be quickly and easily accomplished by placing sleeves 16, 18 into bore 14, from opposite ends thereof, and then connecting the two subassemblies by means of bolt 34 and nut 36.

Figure 2:
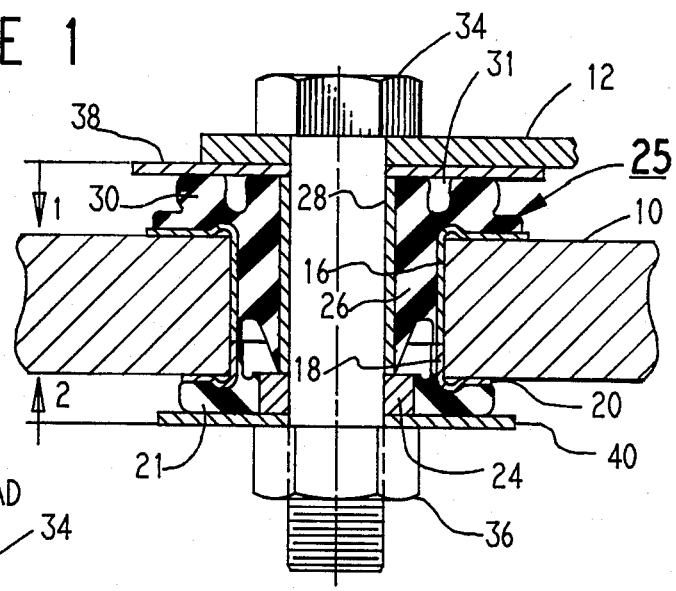
FIG. 2 is a cross-sectional view similar to that of FIG. 1 but wherein the mount is shown in a precompressed condition.
Figure 3:
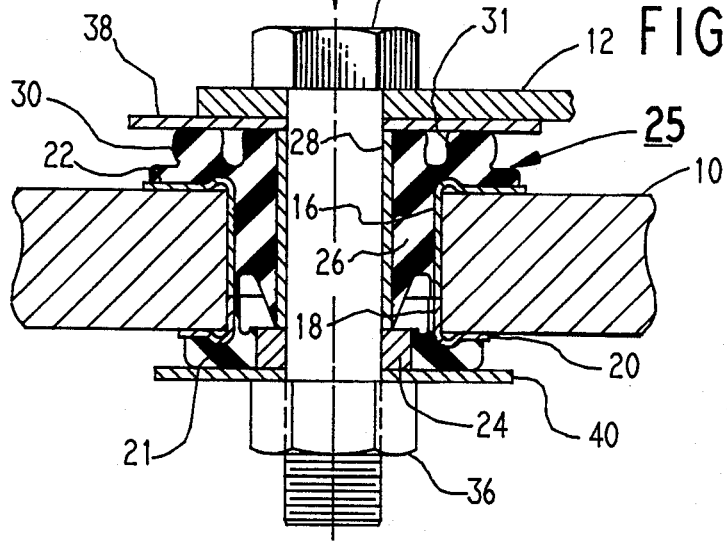
FIG. 3 is a view similar to FIG. 2 but showing the engine mount under static load.
Figure 4:
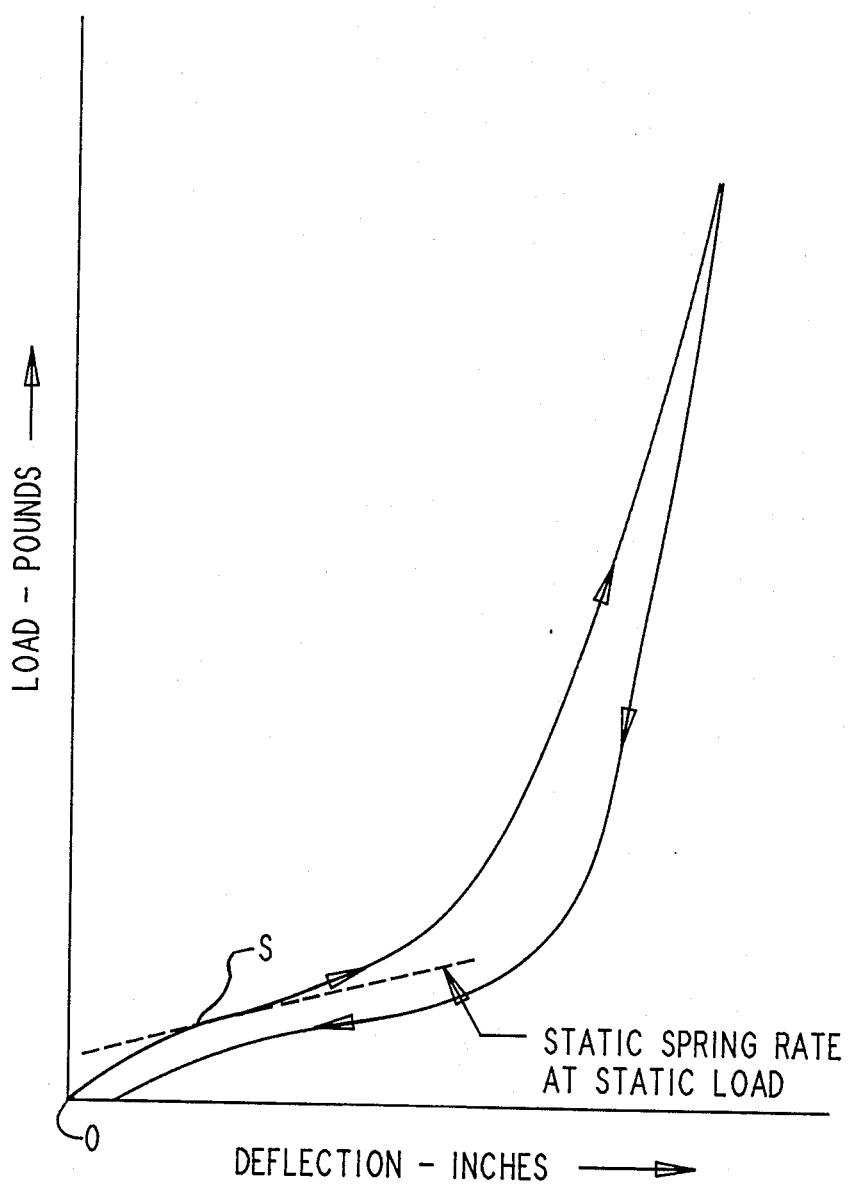
FIG. 4 is a plot of deflection versus load for the engine mount.

FIG. 1 shows the installed mount prior to tightening of nut 36. At such time there is a gap between the lower end of the tubular element 28 and the rigid element 24. FIG. 2 shows the mount after tightening of nut 36. This brings rigid elements 24, 28 into contact with each other, and causes predetermined pre-load deflection of elastomer bodies 25, 21 in the respective directions designated in FIG. 2 by the numerals 1 and 2. FIG. 3 shows the condition of the mounting when it is supporting a static load (engine weight) transmitted thereto by member 12. The static load increases the prior (FIG. 2) deflection of load-supporting body 25 and totally relieves the prior compressive deflection of rebound body 21. The letter S upon the FIG. 4 plot of the load/deflection characteristics of the mounting designates the point at which the static load has relieved all precompression of rebound body 21 and at which the static (and, therefore, steady-state) operational spring rate of the mounting becomes that of the load-supporting body 25. The operational spring rate of body 25 is the vectorial sum of the shear spring rate of its portion 26 and the compression spring rate of its portion 30. Since the spring rates of such portions of body 25 are not interdependent, body 25 may be readily "tailored" so as to cause the mounting assembly to possess such operational spring rate as is best suited for its particular utilization.

The ability of portion 30 of body 25 to undergo substantial compressive deflection during use of the mount is enhanced by its being free to bulge both radially inwardly and radially outwardly. The shape factor (i.e., loaded area divided by area free to bulge) of portion 30, and therefore the compression spring rate thereof, may be extremely low.

Portion 14 of body 25 performs dual functions. It of course assists in the support and accommodation, by shear deflection, of vertical or axial loads and motions. It also imparts lateral stability to the mounting assembly, by resisting in compression and tension tilting and/or radial movement of bolt 34. It will be noted that, in contrast to body portion 30, the shape factor and stiffness of body 14 in compression is quite high.

Although the invention has been shown in connection with a specific embodiment, it will be readily apparent to those skilled in the art that various changes in form and arrangement of parts may be made to suit requirements without departing from the spirit and scope of the invention.

We claim:

1. A resilient load supporting and motion accommodating mounting for innerconnecting supported and supporting members, at least one of said members having an opening therein, comprising:
   a rigid outer sleeve element having a main section and a flange projecting generally radially outwardly from one end of said main section, said main section being disposed within and having a slip-fit relationship with said opening of said one of said members, said flange overlying an exterior surface of said one of said members and being disposed in spaced confronting relationship to a surface of the other of said members;
   a rigid inner tubular element disposed within said opening of said one of said members and having a portion projecting from said opening toward the other of said members;
   a unitary body of elastomer bonded to said rigid sleeve element and to said rigid tubular element;
   said body including a first annular portion disposed between said tubular element and said main section of said sleeve element, said first portion of said body being deflected in shear by movement of said members toward each other;
   said elastomer body including a second annular portion overlying said flange of said sleeve element and projecting therefrom towards said other of said members, said second portion of said body being disposed in encircling spaced relationship to said portion of said rigid tubular element projecting from said opening; said second portion of said body being deflected in compression and bulged both radially inward and radially outward by movement of said members toward each other.

2. A mounting as in claim 1, wherein said opening is a bore, and said main section of said sleeve element is of generally cylindrical shape.

3. A mounting as in claim 2, and further including a rebound assembly for resiliently limiting relative movement of said members away from each other, said assembly including a second rigid sleeve element having a generally cylindrical main section and a flange projecting generally radially outwardly from one end thereof, said main section of said second sleeve element being disposed within and having a slip-fit relationship with said opening of said one of said members, said flange of said second sleeve element overlying an exterior surface of said one of said members other than said first-mentioned surface thereof.

4. A mounting as in claim 3, wherein said sleeve elements engage each other within said opening.

5. A mounting as in claim 4, wherein said rebound assembly further includes a rebound body of elastomer overlying and bonded to said flange of said second sleeve element.

6. A mounting as in claim 5, wherein said rebound assembly further includes an annular rigid member bonded to said rebound body of elastomer and engagable with said rigid inner tubular element.

7. A mounting as in claim 6, and further including a connecting bolt extending through said rigid inner tubular element and through said rigid annular element of said rebound assembly.

* * * * *